March 21, 1967     T. T. FJÄLLBRANT     3,310,803
RADAR APPARATUS
Filed May 3, 1965

INVENTOR.
TORE TORSTENSSON FJÄLLBRANT
BY Hane and Nydick
ATTORNEYS 3,310,803
RADAR APPARATUS
Tore Torstensson Fjällbrant, Staborg, Fjaras, Sweden, assignor to Telefonaktiebolaget L M Ericsson, Stockholm, Sweden, a corporation of Sweden
Filed May 3, 1965, Ser. No. 452,820
Claims priority, application Sweden, May 6, 1964, 5,648/64
2 Claims. (Cl. 343—17.1)

The present invention refers to a radar apparatus arranged to send pulse signals in a known way with a certain frequency and to receive echo signals reflected by the surroundings for visual indication on an indicator working with a periodically repeated saw tooth-like time deflecting voltage. The purpose of the invention is to manufacture a radar apparatus of the kind above mentioned with which it is possible to achieve an improved probability for detecting echo in noise during a certain part of a range or distance scanning as compared with earlier known similar apparatus. This improved detecting probability is achieved at the cost of an inferior detecting probability during the remaining part of the distance scanning, which, however, can be tolerated as it can be postponed until the part of the distance scanning when strong echo signals are obtained.

A radar apparatus designed according to the invention is characterized thereby that between the input circuit of the radar apparatus and the indicator there is connected a variable delay circuit. This circuit is arranged so that during the period between two transmitted pulse signals it works with decreasing delay at the beginning and after that with increasing delay. In addition, the indicator is so arranged that during the period between two transmitted pulse signals it works with a more rapid increasing time delay voltage than normal at the beginning and after that with a slower increasing time delay voltage than normal.

Figure 1:
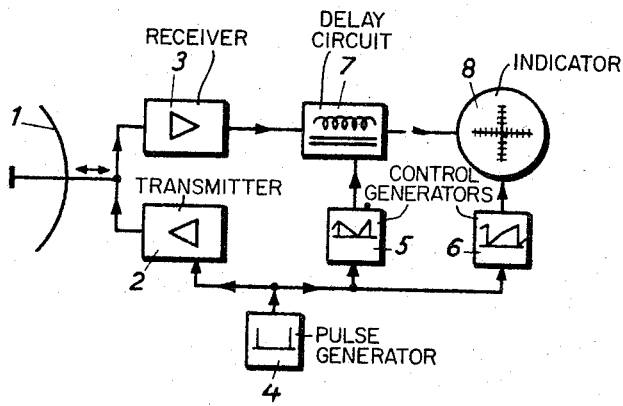
Figure 2:
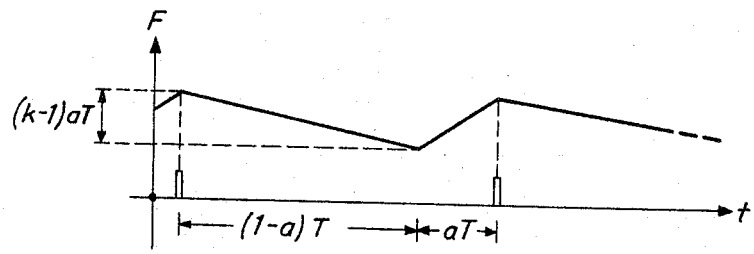
Figure 3:
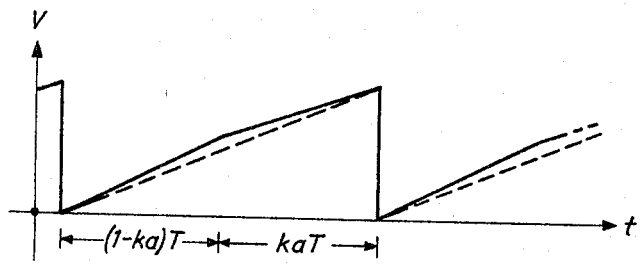

The invention will be further described in connection with the attached drawing, where FIG. 1 schematically shows a block diagram of a radar apparatus according to the invention, FIG. 2 shows by the resulting delay time F that the signals arriving at different instants of time after a transmitted pulse are delayed by a delay circuit included in the radar apparatus according to FIG. 1, and FIG. 3 shows the time delay voltage V as a function of time $t$ for an indicator included in the radar apparatus according to FIG. 1.

The radar apparatus according to FIG. 1 comprises a radar antenna 1 with its feeder, a transmitter 2, a receiver 3, a synchronizing generator 4, a delay circuit 7 with a controlling generator 5 and an indicator 8 with a controlling generator 6. The synchronizing generator 4 feeds synchronizing pulses to the transmitter 2 and to the two controlling generators 5 and 6. The transmitter 2 feeds a series of pulse signals to the antenna 1 and the receiver 3 receives echo signals picked up by the antenna 1. In the usual way the receiver 3 is blocked when the transmitter sends the pulse signals. Echo signals received by the receiver 3 are fed to the delay circuit 7. Circuit 7 is so arranged that during the period T between two transmitted pulse signals it works with a delay decreasing in such a way that the resulting delay of incoming signals during the period $(1-a) \cdot T$ decreases linearly as regards the point of time for incoming signals and shows a corresponding increasing delay of the signals coming in during a following period $aT$. The constant $a$ has a value greater than zero and less than one and is chosen with regard to how large a part of the distance area an improved detecting probability is wanted on the indicator 8. Indicator 8 is connected to the output side of the delay circuit 7 and is arranged to work with more rapid linearly increasing time deflecting voltage than normal during the period $(1-k \cdot a) \cdot T$ and with slower linearly increasing time deflecting voltage than normal during a time period $k \cdot a \cdot T$. The value $k$ defines the rate of the expansion of time with respect to the compression of incoming signals. The value $k$ is obtained from the expression $$k = \frac{\Delta F}{a \cdot T} + 1$$

where $\Delta F$ is the difference between the maximum and minimum delay introduced by the delay circuit on signals entering during the period T between two transmitted pulse signals. FIGS. 2 and 3 show the case where $a$ is equal to ¼ and $k$ is equal to 2.

The radar apparatus operates such that during the first part of the distance scan the decreasing delay in the delay circuit 7 causes the length of the echo signals to decrease while the noise coming in with the echo signal increases in frequency.

During the second part of the distance scanning the increasing delay in the delay circuit 7 causes the length of the echo signal to increase while the frequency of the noise decreases. By a suitable adaptation of the deflection of the indicator 2 in distance direction the echo signals can have the same propagation on the indicator screen. Therefore, the probability of detecting increases during the "extending" part of the scanning since the echo signals are presented during a longer time than normal while the incoming noise effect per time unit is unchanged, except that it has another frequency distribution. The probability of detecting decreases of course during the "compressing" part of the scanning by presenting echo signals during a shorter time than normal, but that is of less account when there is a region of increase of detecting probability which is larger than the decrease of detecting probability. The increase arises during times when it really is required, that is when echo signals from rather distant places are expected to come in. As an example it can be mentioned that if the value $a$ is chosen to equal ¼ and the value $k$ to equal 2, the increase of detecting probability for ¼ of the distance area will be about 3$d$B while the decrease for the rest of the area will be about 1$d$B. If the value of $a$ is chosen less than ¼ the increase of detecting probability may be larger, but account must be taken to the fact that the advantage also is dependent of the integration capacity of the indicator 2.

The delay circuit 7 can be of such a kind that is controlled by variation of the permeability, that is if the circuit is a delay line which is wound on a ferrite bar, or by variation of the capacitance, that is if the delay line is built up of links. By a suitable design of the controlling generator 5, it can be achieved that the part of the distance scanning is automatically extended where an echo signal is expected to appear.

The functions shown in FIGS. 2 and 3 are quite linear. This is of course per se not necessary. It is merely required that these functions are so adapted in relation to one another that equal long echo signals coming in from different distances will get extents on the screen of the indicator 8, which are generally mutually equal.

I claim:
1. A radar apparatus comprising means for transmitting periodically occurring range pulses; receiver means including an input for receiving echo pulses and an output; a variable delay circuit means including an input connected to the output of said receiver means and an output, said delay circuit means delaying transmission of signals from its input to its output with a decreasing delay for a first part of the interval between two transmitted range pulses and with an increasing delay for a subse- quent part of said interval; and an indicator means including an input connected to the output of said delay circuit means for displaying the delayed received echo pulses, said indicator means including a periodic sawtooth voltage generator means for generating a deflecting voltage in synchronism with the transmitted range pulses, the deflecting voltage increasing at a rate greater than a predetermined rate during one part of the interval between two transmitted range pulses and decreasing at a rate less than a predetermined rate during the remainder of said interval.

2. The radar apparatus of claim 1 wherein the period between two transmitted range pulses is T seconds, said first part of the interval during which said delay circuit means delays with a decreasing rate is $(1-a) \cdot T$ seconds and said subsequent part of the innterval is $a \cdot T$ seconds and said one part of the interval between two transmitted range pulses during which the deflecting voltage increases at a rate greater than a predetermined rate is $(1-ka) \cdot T$ seconds and said remainder of the interval is $k \cdot a \cdot T$ seconds, $a$ being a constant having a value between zero and one, $k$ being equal to $$\frac{\Delta F}{a \cdot T} + 1$$

where $\Delta F$ is the difference between the maximum and minimum delay of signals received by said delay circuit means during the interval between two transmitted pulses.

References Cited by the Examiner
UNITED STATES PATENTS
2,455,283   11/1948   Valley.

RODNEY D. BENNETT, *Acting Primary Examiner.*